July 22, 1924.
W. KNUTSON
TIRE ALARM
Filed May 21, 1923
1,502,039
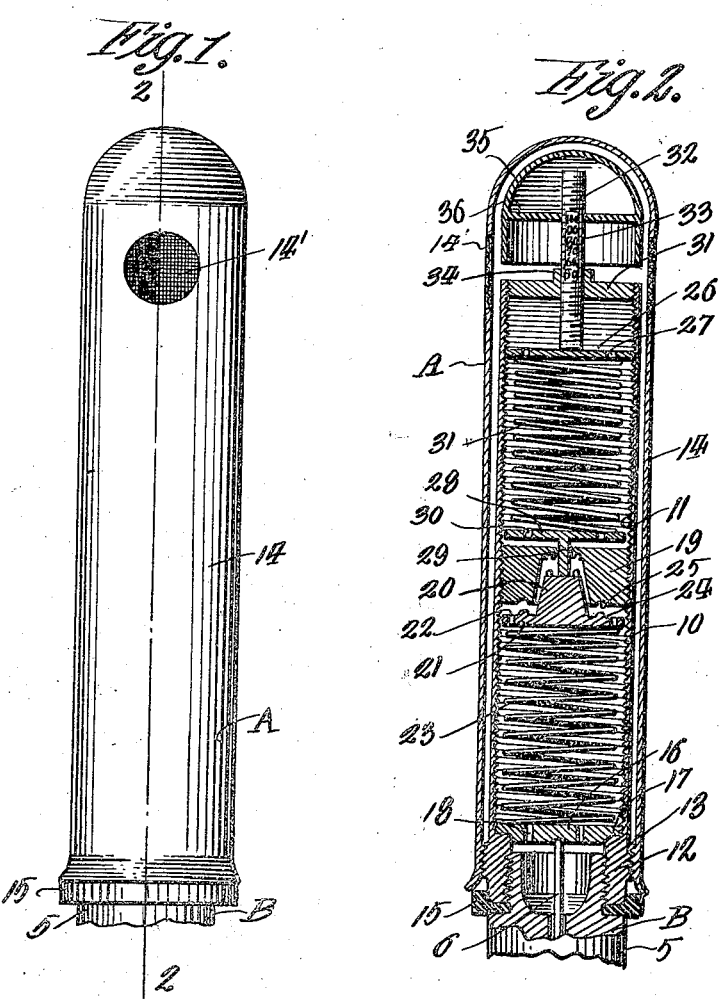
WITNESSES
Inventor
WILLIAM KNUTSON
Attorney Patented July 22, 1924.

1,502,039

UNITED STATES PATENT OFFICE.

WILLIAM KNUTSON, OF FORT SHAW, MONTANA.

TIRE ALARM.

Application filed May 21, 1923. Serial No. 640,614.

*To all whom it may concern:*

Be it known that I, WILLIAM KNUTSON, a citizen of the United States, residing at Fort Shaw, in the county of Cascade and State of Montana, have invented certain new and useful Improvements in a Tire Alarm, of which the following is a specification.

This invention relates to motor vehicles and more particularly to pneumatic tires therefor.

The primary object of the present invention is the provision of a novel device associated with a vehicle tire and wheel for giving a signal, when the pressure in the tire falls below a predetermined point and thereby effectively warning the driver of the vehicle that his tire needs attention.

Another prime object of the invention is the provision of an audible signal for giving warning to the driver of the vehicle when pressure in the tires falls below a predetermined point, whereby the necessary attention can be given thereto, thereby effectively saving the tires from rim cuts, stone bruises and the like.

A further prime object of the invention is the provision of a novel attachment for association with the ordinary air valve of a pneumatic tire embodying means for permitting the escape of the air from the tire when the pressure in the tire falls below a predetermined point and to provide a whistle disposed in the path of the escaping air, whereby a signal will be given.

A still further object of the invention is to provide a tire alarm of the above character, which will be durable and efficient in use, one that will be simple and easy to manufacture and one which can be readily associated with a vehicle wheel and tire at a minimum cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved tire alarm, and

Figure 2 is a longitudinal section through the same.

Referring to the drawings in detail, wherein similar reference characters designate corresponding parts throughout the several views, the letter A generally indicates the improved tire alarm and B the ordinary tire filling valve. As shown the tire filling air valve B comprises the ordinary casing 5, through which projects the ordinary valve stem 6. As is common, the valve stem 6 can be depressed for unseating the valve of the tire filling valve B for permitting the escape of air from the tire.

The improved attachment A comprises a cylindrical body 10 which is preferably threaded internally throughout its length as at 11. The extreme inner end of the body 10 is provided with a restricted neck portion 12, which is adapted to be threaded on the outer end of the ordinary tire filling valve B. As shown the outer surface of the restricted neck portion 12 is provided with external threads 13 for the reception of a protecting cap 14 which is adapted to house all of the parts of the attachment. This protecting dust cap 14 will be hereinafter more fully described. In order to form a fluid tight joint between the neck 12 and the body 5 of the ordinary air filling tire valve B I provide a rubber gasket 15 which is disposed between the inner end of the neck and a shoulder formed on the said body 5.

A circular plate 16 is disposed within the body 10 and rests upon a shoulder 17 formed by the restricted neck 12 and this plate 16 is adapted to engage the outer end of the valve stem 6 for pushing the same inward and unseating the valve, when the attachment is associated with the said body 5. In order to permit the escape of the air through the plate 16 suitable air escape openings 18 are formed in the same. At a point intermediate the ends of the body 10 I provide a valve seat 19 which is externally threaded to permit the ready positioning thereof in the said body. Adapted to fit upon the valve seat 19 I provide a frusto-conical shaped valve head 20 which is provided with a disk-shaped plate 21 having air escape openings 22 therein. This valve 20 is normally held upon its seat by the air pressure from the tire and in order to insure the normal seating thereof I provide an expansion coil spring 23 which engages the base plate 21 of the valve 20 and the supporting plate 16. In order to prevent turning of the valve and the base plate 21 I provide raised tits 24 which are adapted to fit in depressions 25 formed on the inner surface of the valve seat 19.

Disposed adjacent the outer end of the body 10 I provide an adjustable bearing plate 26 which is also provided with air escape openings 27. This plate is externally threaded to engage the internal threads 11 formed in the body.

In order to permit the unseating of the valve 20 when the air in the tire falls below a predetermined point, I provide a valve operating plate 28 which is provided at its axial center with a depending stem 29 which is adapted to extend through the valve seat 19 and engage the outer surface of the valve 20. This plate 28 is provided with air escape openings 30. A relatively heavy expansion spring 31 is disposed between the plate 26 and the plate 28 and is adapted to unseat the valve 20 against the tension of the spring 23 when the pressure in the tire falls below a predetermined point. The extreme outer end of the body 10 carries a supporting plate 31 which adjustably carries a threaded stem 32. This stem 32 can be threaded into and out of the body 10 and serves as means for indicating the position of the plate 26. As stated, by adjusting the plate 26, the tension of the spring can be adjusted and by turning the stem 32 into engagement with the plate the pressure at which the valve will be unseated can be determined. This is accomplished through the medium of a graduated scale 33 on the said stem. The stem 32 can be held in an adjusted position by means of a holding nut 34 if so desired.

The whistle is carried by the outer end of the body and the stem 32 forms a part thereof and supports the dome 35 of the said whistle. As shown the dome is provided with a cross strap 36 which engages the stem. It is obvious that when the pressure in the valve falls below a predetermined point that the spring 31 being stronger than the spring 23 will overcome the tension thereof and the existing pressure acting on the valve and thus bring about the unseating thereof, which will permit the air to be forcibly injected into the dome 35 and escape between the lower edge thereof and the outer end of the body, which will cause the sounding of the whistle and thus effectively give an alarm.

As clearly shown in Figure 1, the protecting cover 14 is provided with screen covered openings 14', which permit the escape of the air from the cover.

From the foregoing description it can be seen that I have provided an exceptionally simple and compact attachment for vehicle tires which will effectively give an alarm, when the pressure in the tires falls below a predetermined point.

Changes in details may be made providing the same do not depart from the spirit or scope of the invention, as set forth in the annexed claim.

What I claim as new is:

The combination with an ordinary tire air filling valve including a body and a valve stem, of an attachment therefor including a body arranged to receive the outer end of the air valve filling body, a valve seat adjustably carried by the body of the attachment, a normally closed valve carried by the body of the attachment for fitting upon the seat, an adjustable plate threaded into the body of the attachment opposite of said valve seat, a spring engaging said adjustable plate for unseating the valve when the pressure in the air filling tire valve falls below a predetermined value, means for indicating the position of said adjustable plate, and a whistle carried by said means adapted to be sounded by the escape of air through said valve body.

In testimony whereof I affix my signature in presence of two witnesses.

WILLIAM KNUTSON.

Witnesses:
J. THORUD,
FRANK J. HIRSHBERG.